(12) United States Patent
Ferrer et al.

(10) Patent No.: US 8,888,448 B2
(45) Date of Patent: Nov. 18, 2014

(54) METHOD FOR THE MANUFACTURE OF A CIRCULAR REVOLUTION THERMOMECHANICAL PART INCLUDING A TITANIUM-BASED LOAD-BEARING SUBSTRATE LINED WITH STEEL OR SUPERALLOY, A TURBOMACHINE COMPRESSOR HOUSING WHICH IS RESISTANT TO TITANIUM FIRE OBTAINED ACCORDING TO THIS METHOD

(75) Inventors: Laurent Ferrer, Lieusaint (FR); Claude Marcel Mons, Savigny le Temple (FR)

(73) Assignee: Snecma, Paris (FR)

( * ) Notice: Subject to any disclaimer, the term of this patent is extended or adjusted under 35 U.S.C. 154(b) by 724 days.

(21) Appl. No.: 13/060,748

(22) PCT Filed: Sep. 3, 2009

(86) PCT No.: PCT/EP2009/061387
§ 371 (c)(1),
(2), (4) Date: May 16, 2011

(87) PCT Pub. No.: WO2010/026182
PCT Pub. Date: Mar. 11, 2010

(65) Prior Publication Data
US 2011/0206503 A1    Aug. 25, 2011

(30) Foreign Application Priority Data
Sep. 5, 2008    (FR) ..................... 08 55961

(51) Int. Cl.
| | |
|---|---|
| F01D 25/24 | (2006.01) |
| F04D 29/52 | (2006.01) |
| F04D 29/02 | (2006.01) |
| F01D 25/08 | (2006.01) |
| B21K 3/00 | (2006.01) |
| B32B 15/01 | (2006.01) |
| B23P 15/00 | (2006.01) |
| F02C 7/25 | (2006.01) |
| B21D 26/051 | (2011.01) |

(52) U.S. Cl.
CPC .............. *B23P 15/00* (2013.01); *F04D 29/526* (2013.01); *F04D 29/023* (2013.01); *F01D 25/08* (2013.01); *B21K 3/00* (2013.01); *F01D 25/24* (2013.01); *B32B 15/013* (2013.01); *Y02T 50/675* (2013.01); *F05D 2300/133* (2013.01); *Y02T 50/671* (2013.01); *F02C 7/25* (2013.01); *Y02T 50/67* (2013.01); *B21D 26/051* (2013.01)
USPC ......................................... 415/200; 29/421.1

(58) Field of Classification Search
USPC .................. 415/182.1, 200, 220, 217.1, 196; 148/527, 530; 29/421.1
See application file for complete search history.

(56) References Cited

U.S. PATENT DOCUMENTS 3,434,194 A * 3/1969 Whittaker et al. ........... 29/421.2
4,155,680 A * 5/1979 Linko et al. .................. 415/144
(Continued)

FOREIGN PATENT DOCUMENTS

| EP | 0 305 113 A2 | 3/1989 |
| EP | 0 305 113 A3 | 3/1989 |

(Continued)

OTHER PUBLICATIONS
U.S. Appl. No. 13/501,610, filed Apr. 12, 2012, Ferrer, et al.
(Continued)

*Primary Examiner* — Edward Look
*Assistant Examiner* — Juan G Flores
(74) *Attorney, Agent, or Firm* — Oblon, Spivak, McClelland, Maier & Neustadt, L.L.P.

(57) ABSTRACT

A method for manufacture of a compressor housing which is resistant to a titanium fire (burning titanium). A circular blank made of steel, or steel alloy, or superalloy which is incombustible in the presence of a titanium fire is hydroformed against a circular blank made from titanium or titanium alloy.

13 Claims, 3 Drawing Sheets

(56) References Cited

U.S. PATENT DOCUMENTS

Figure 1:
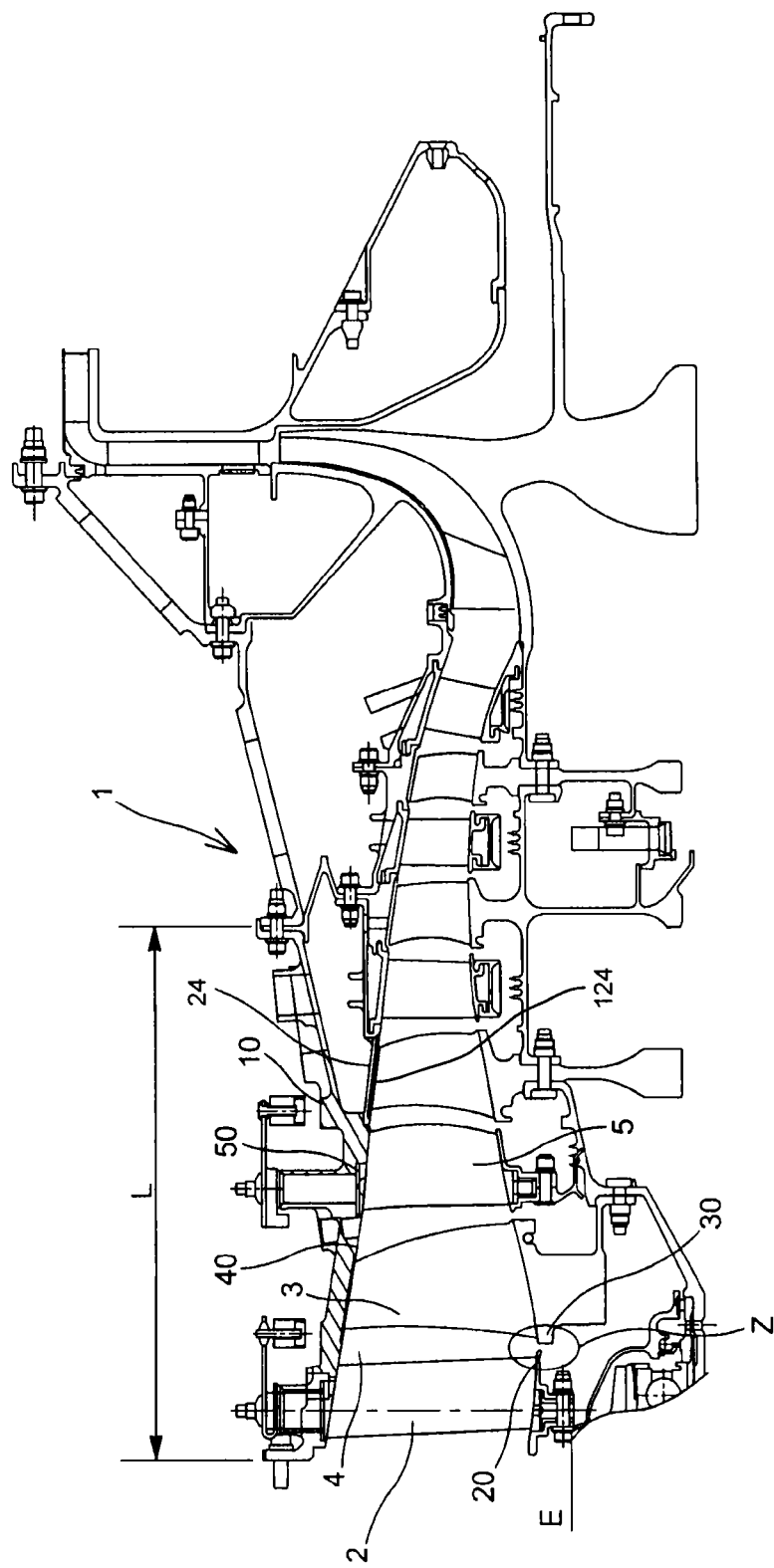

| | | | |
|---|---|---|---|
| 4,642,027 A | | 2/1987 | Popp |
| 4,659,282 A | | 4/1987 | Popp |
| 4,738,822 A | * | 4/1988 | Bania ........................... 420/419 |
| 4,964,564 A | | 10/1990 | Neal et al. |
| 5,664,327 A | * | 9/1997 | Swars ......................... 29/888.08 |
| 5,924,288 A | * | 7/1999 | Fortuna et al. .................. 60/752 |
| 6,390,771 B1 | | 5/2002 | Gervais et al. |
| 6,531,005 B1 | * | 3/2003 | Bezerra et al. ................ 148/516 |
| 2002/0108682 A1 | * | 8/2002 | Li et al. .......................... 148/407 |
| 2005/0109013 A1 | * | 5/2005 | Eleftheriou et al. ......... 60/226.1 |
| 2006/0021680 A1 | | 2/2006 | Li et al. |
| 2006/0068214 A1 | | 3/2006 | Gigliotti et al. |
| 2009/0047126 A1 | | 2/2009 | Ress, Jr. |

FOREIGN PATENT DOCUMENTS

| | | |
|---|---|---|
| EP | 1 002 882 A1 | 5/2000 |
| EP | 1 059 420 A1 | 12/2000 |
| EP | 1 643 011 A1 | 4/2006 |
| FR | 2 560 640 A1 | 9/1985 |
| FR | 2 560 641 A1 | 9/1985 |
| GB | 1 344 667 | 1/1974 |

OTHER PUBLICATIONS

U.S. Appl. No. 13/501,377, filed Apr. 11, 2012, Ferrer, et al.
U.S. Appl. No. 13/501,568, filed Apr. 12, 2012, Ferrer, et al.
U.S. Appl. No. 13/060,726, filed Feb. 25, 2011, Ferrer, et al.
U.S. Appl. No. 13/060,719, filed Feb. 25, 2011, Ferrer, et al.
International Search Report issued on Nov. 5, 2009 in corresponding International Application No. PCT/EP2009/061387.
French Preliminary Search Report issued on Apr. 30, 2009 in corresponding French Application No. 0855961.

* cited by examiner

METHOD FOR THE MANUFACTURE OF A CIRCULAR REVOLUTION THERMOMECHANICAL PART INCLUDING A TITANIUM-BASED LOAD-BEARING SUBSTRATE LINED WITH STEEL OR SUPERALLOY, A TURBOMACHINE COMPRESSOR HOUSING WHICH IS RESISTANT TO TITANIUM FIRE OBTAINED ACCORDING TO THIS METHOD

TECHNICAL FIELD

The invention concerns the manufacture of a circular revolution thermomechanical part including a titanium-based load-bearing substrate lined with steel or superalloy.

It concerns more particularly the manufacture of a compressor housing which is resistant to titanium fire.

It also concerns a high-pressure axial compressor comprising such a housing and an aircraft engine, such as an aircraft turbojet fitted with such a housing.

PRIOR ART

In a turbomachine such as an aircraft turbojet the high-pressure compressor housings must demonstrate their ability to resist a fire known as a "titanium fire".

Such a titanium fire is caused by undesired friction appearing between a moving part, for example a rotor blade, made from titanium, of the compressor and a stationary titanium part of the compressor. This undesired friction may lead to local overheating of at least one of the parts in contact: a rotor blade or stationary part, which leads to volume combustion of the titanium alloy. The temperature of the burning liquid material (titanium or titanium alloy) may reach 2700° C. either locally in the friction zone, or inside the burning titanium particles which are projected in the airstream of the compressor from the friction zone. As a result, the melting points of the surrounding material brought into contact with the liquid titanium are exceeded, which thus generates fuel in the structure. This phenomenon is maintained by substantial pressures and oxygen flow rates, which are found at the airstream inlet in modern high-pressure compressors. Thus, in the case of new-generation turbojets requiring high pressures at the inlet of the high-pressure axial compressor, there is a potential risk of friction possibly leading to the combustion of titanium, for example between the first row of stator blades and the nozzle formed by the lower part of the rotor blades. Subsequently, the burning particles can be projected in the compressor airstream and reach the outer housing. In the past, titanium fires went as far as traversing all the way through housing walls, with the resulting prejudicial consequences. These consequences are particularly prejudicial since the titanium fire can only be extinguished by itself during the operation of a functioning turbojet.

To protect the compressor housings from titanium fires various solutions have already been proposed.

Certain thermal techniques for protecting housings used are either Draconian (elimination of titanium-based alloys and replacement by steel or steel alloy or superalloys or nickel bases or bases of other materials), or sophisticated (installation of specific liners on the titanium- or titanium alloy-based housing, thermal protection accomplished by means of plasma, treatment of surfaces which are potentially in contact when the engine is in operation). One may cite as thermal protection liner-layers the solutions described in patents FR 2 560 640 and FR 2 560 641. However, these solutions prove to be heavy, cumbersome and sometimes limited over time, i.e. not compatible with lifetimes of turbomachines such as aircraft turbojets.

The literature also mentions non-combustible titanium alloys, but which have higher density than standard alloys. None of these alloy-based solutions said to be non-combustible has genuinely been validated at the time of writing.

The aim of the invention is thus to propose a solution enabling a turbomachine compressor housing to be protected from every titanium fire which might break out, whilst maintaining most of the advantages of titanium or of its conventional alloys (high mechanical resistance and low density).

ACCOUNT OF THE INVENTION

To this end, the purpose of the invention is a method for the manufacture of a circular revolution thermomechanical part comprising a load-bearing substrate made from titanium or titanium alloy lined with a steel or superalloy, wherein the following steps are taken:

a/ production of a preform made from titanium or titanium alloy having a general circular shape as close as possible to the shape and external dimensions of the part to be manufactured, b/ production of a preform made from steel or steel alloy or superalloy incombustible in the presence of burning titanium, having a general circular shape of diameter(s) less than the circular blank made from titanium or titanium alloy and as close as possible to the shape and internal dimensions of the part to be manufactured, c/ machining, using the internal dimensions of the part to be manufactured, of the inner surface of the blank made from steel or steel alloy or superalloy, d/ fitting of the blank made from steel or steel alloy or superalloy in the blank made from titanium or titanium alloy, e/ cladding by hydroforming of the blank made from steel or steel alloy or superalloy against the blank made from titanium or titanium alloy under process conditions such that the mechanical bonds created at the interface have no fragile phases in the course of the thermomechanical cycles to which the part is subsequently subjected.

According to the invention, a hydraulic cladding is accomplished, which enables the steel or steel alloy or superalloy to be bonded mechanically with the titanium or titanium alloy, avoiding subsequent tempering or annealing thermal treatments.

The technique used is that of a hydraulic cladding of a plate, but judiciously adapted to blanks which are generally circular in shape, and with a load-bearing structure made from titanium or titanium alloy, and a cladding material made from steel or steel alloy or superalloy. The technique of hydraulic cladding or hydroforming is known.

The solution according to the invention constitutes an effective response to the titanium fire, whilst retaining most of the intrinsic advantage of titanium, namely a low density and a high mechanical resistance, for the load-bearing structure.

The superalloys(s) according to the invention may advantageously be cobalt- or nickel-based.

According to an advantageous characteristic of the invention, step a/ is accomplished by beta or alpha-beta forging or by casting of a titanium alloy.

According to another advantageous characteristic, step b/ is accomplished by pre-rolling or by rolling of a plate or by drawn rolled welded techniques using a steel alloy or superalloy. To accomplish step e/ it is possible advantageously to proceed as follows:

the blanks fitted one into the other are heated to a temperature of between 150 and 500° C., a plastic receptacle, filled with an incompressible fluid, and in direct contact with the inner surface of the steel or steel alloy blank, is deformed by compression.

Step b/ can advantageously be accomplished with circumferential undulations on the inner surface of the blank made from titanium or titanium alloy in order to improve the mechanical properties of the bonds in the axial direction of the part.

Thus, according to the invention, it is possible to use existing steels, steel alloys or superalloys which are incombustible in the presence of burning titanium. These steels or steel alloys or superalloy are also thermally compatible (thermal treatment compatibility and similar expansion coefficients) with titanium or titanium-based alloys, which also already exist, in the manufacture of compressor housings, in particular high-pressure turbojet compressors.

The invention also concerns a housing obtained by the method as described above.

The preferred material for the inner layer made from steel, steel alloy or superalloy is chosen from among Inconel® 909 or Inconel® 783.

A particularly advantageous titanium alloy is chosen from among Ti 6 4, Ti 6242 or Ti 6246.

According to a variant, the clad part can be of a length corresponding to only one part of the annular length of the housing.

On the inner diameter of the clad part, or downstream from the length to which it is attached, a wear material suitable for defining the outer contour of the airstream can be attached on to a part made from titanium or titanium alloy. This wear material constitutes the abradable of the rotor blades, i.e. a material capable of being planed or eroded by the friction of the rotating blade heads against the housing.

The invention also concerns a high-pressure axial compressor comprising, as a stator, a housing as previously defined.

According to an advantageous embodiment, the length of the housing constitutes only the part upstream from the compressor, where the inner wall demarcating the outer contour of the downstream airstream is made from titanium or titanium alloy.

Finally, the invention concerns an aircraft engine including a compressor as referred to above.

BRIEF DESCRIPTION OF THE ILLUSTRATIONS

Figure 2A:
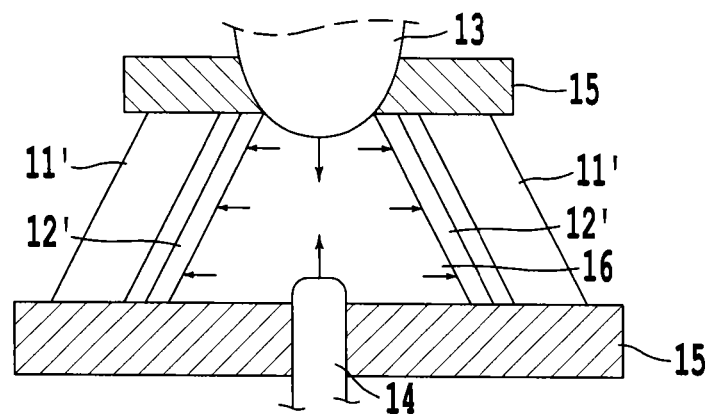
Figure 2B:
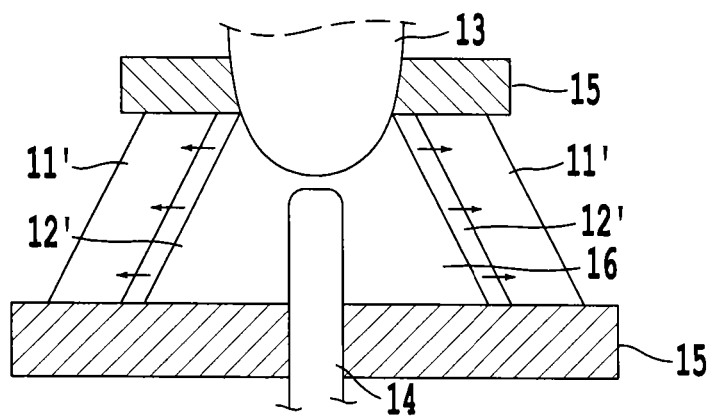
Figure 3:
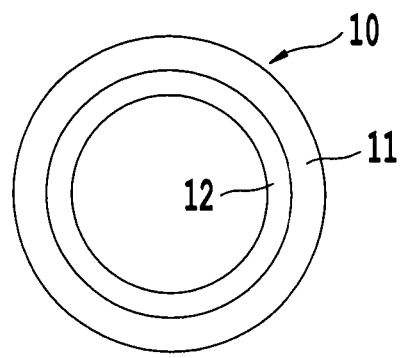
Figure 3A:
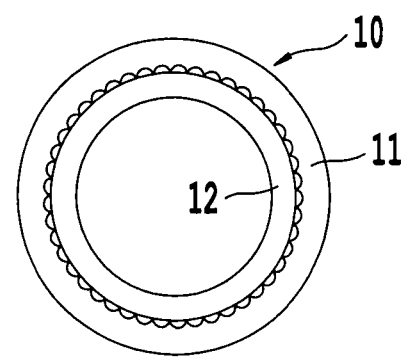

Other characteristics and advantages of the invention will be seen more clearly on reading the detailed description below, made with reference to the following figures, among which:

FIG. 1 is a lengthways section view of a high-pressure axial compressor of an aircraft turbojet according to the invention, FIGS. 2A and 2B are section schematic views of a step in the method of manufacture of a circular revolution thermomechanical part according to the invention, FIG. 3 is a cross-section, schematic view of a compressor housing obtained according to the method of the invention, and FIG. 3A is a cross-section schematic view of a compressor housing obtained according to another embodiment of the method of the invention.

DETAILED ACCOUNT OF PARTICULAR EMBODIMENTS

In FIG. 1 a high-pressure compressor 1 of a new-generation turbojet, i.e. with high pressures at inlet E, has been represented.

This type of compressor 1 includes a first row of gas diffusion stator blades 2 upstream from a first row of rotor blades 3. All the blades 2, 3 are made from titanium or titanium alloy. During the operation of the turbojet there is a risk of severe contact by friction between the base 20 of the stator blades 2 and the base 30 of the rotor blades 3 in the zone Z illustrated in FIG. 1.

This risk of severe contact by friction may lead to ignition of the titanium in this zone Z. It is then necessary to prevent burning titanium particles from propagating the combustion to the outer housing 10. Indeed, such particles can be expelled in the airstream of the gases 4 and as a result come into contact with the outer housing 10. The risk of contact is greater with the downstream part of the latter 10, which extends over a certain length L. This length L is the distance between two points, one of which marks the inversion of the inclinations in the profile of the housing, and the other of which is a mating surface with the downstream structure of the HP compressor, which becomes a superalloy structure in a gas stream.

If this outer housing 10 is made exclusively of titanium or titanium alloy, a titanium fire can then be created and thus spread to all the other parts constituting the turbojet.

To prevent this, according to the invention, an outer housing 10 is manufactured from a part the outer layer 11 of which is made from titanium or titanium alloy, and on to which is clad an inner layer 12 made from steel or steel alloy or superalloy which is incombustible in the presence of burning titanium. The inner layer 12 made from steel or steel alloy which is incombustible in the presence of burning titanium thus constitutes in a certain sense a thermal barrier for the load-bearing structure, against any burning titanium particle which might enter this part L of the housing 10.

The inner wall 12 of the housing demarcating the outer contour 40 of the compressor airstream 4 is thus constituted by the layer of steel or steel alloy.

The housing 10 constitutes the upstream part of the compressor 1. An inner wall 24 demarcating the outer contour of the airstream downstream from upstream part of the compressor is made from titanium or titanium alloy. A wear material 124 may be attached to the inner wall to define the outer contour of the airstream.

In the illustrated embodiment the outer layer 11 is made from titanium alloy Ti 6.4. The inner layer 12 of cladding is made from a low expansion coefficient alloy such as inconel® 909 or 783.

According to the invention, in order to obtain the housing 10 according to the invention, one proceeds as follows:

Firstly, hot forming is accomplished preferably by beta or alpha-beta forging of a preform 11' made from titanium alloy Ti 6.4, giving it the shape of a truncated cone. Blank 11' is produced as close as possible to the outer shape and the outer dimensions of the housing 10.

In parallel a circular preform 12' made from Inconel® 909 steel alloy is produced, also in the shape of a truncated cone of a smaller diameter than the ring 11' made from Ti 6.4. Blank 12' is produced as close as possible to the inner shape and the inner dimensions of the housing 10.

The inner surface of the truncated cone 12' made from steel alloy is then machined to the inner dimensions of the housing 10 to be obtained.

The truncated cone 12' made from steel alloy is then fitted in the truncated cone 11' made from titanium alloy.

Both these truncated cones 11', 12' are then positioned in a hydraulic press as shown in FIG. 2A.

The assembly is then heated to a temperature of between 150° C. and 500° C.

The actual step of hydraulic cladding of the steel alloy 12' against the layer of titanium 11' is then accomplished.

By this means, a plastic receptacle 15 filled with an incompressible fluid 16 in direct contact with the inner surface of the blank made from steel or steel alloy or superalloy 12' is then crushed with two heaps 13, 14 (FIG. 2A). The expansion of the receptacle thus allows the compression of the interface (FIG. 2B), and also allows mechanical bonds to be produced with no fragile phases during the thermomechanical cycles to which the housing 10 is subsequently subjected.

Using the method according to the invention, a circular revolution thermomechanical part is obtained the density of which is between 4.7 and 5.8 kg/dm$^3$.

For application to the turbojet housing, it is possible, using this method, to produce a housing 10 with a final thickness of the order of 1 to 2 mm.

To finish the circular revolution thermomechanical part 11', 12' obtained according to the method of the invention, and to achieve the housing 10, the steps of inspection and finishing traditionally used in the manufacture of turbojet compressor housings are followed.

The outer housing 10 clad according to the invention enables a load-bearing structure 11 made from titanium alloy (Ti 6 4, 6242 or 6246, for example) to be retained, protected from risks of titanium fire by the inner layer 12.

A cross-section view of the housing 10 with the outer layer 11 onto which is clad the inner layer 12 is shown in FIG. 3. Another embodiment of the housing is shown in FIG. 3A, in which circumferential undulations are formed on the inner surface of the blank made from titanium or titanium alloy.

Moreover, using the hydraulic cladding method according to the invention, the inner layer made of steel or steel alloy or superalloy in a certain sense constitutes a part of the load-bearing structure and also contributes to the mechanical properties of the housing.

The invention as described enables:

A/ the airstream of the high-pressure compressors to be protected by means of an alloy which is incombustible when exposed to a titanium fire, B/ the outer part or load-bearing structure to be manufactured with a titanium alloy outside the zone potentially concerned by the titanium fire, C/ a substantially lower mass to be maintained, compared to solutions involving housings made completely of steel or steel alloy. For example, it may be permitted to envisage an outer housing 10, using as the clad inner layer Inconel® 909 of the order of 1 to 2 mm, as produced along the length L in the illustrated embodiment, having a weight approximately 10 kg lower than a housing of identical shape and dimensions made entirely from Inconel® 909. Thus, the "average" density of the housing according to the invention is equivalent to that of a housing made from alloys derived from titanium said to be fire-proof.

The invention claimed is:

1. A method for manufacture of a circular revolution thermomechanical part including a load-bearing substrate made from titanium or titanium alloy lined with a steel or superalloy, the method comprising:
   a) producing a first blank made from titanium or titanium alloy having a general circular shape as close as possible to a shape and external dimensions of the part to be manufactured;
   b) producing a second blank made from steel, or steel alloy, or superalloy incombustible in presence of burning titanium, having a general circular shape including at least one diameter less than a diameter of the circular first blank made from titanium or titanium alloy and as close as possible to the shape and internal dimensions of the part to be manufactured;
   c) machining, using the internal dimensions of the part to be manufactured, an inner surface of the second blank made from steel, or steel alloy, or superalloy;
   d) fitting the second blank made from steel, or steel alloy, or superalloy in the first blank made from titanium or titanium alloy; and
   e) cladding by hydroforming of the second blank made from steel, or steel alloy, or superalloy against the first blank made from titanium or titanium alloy under process conditions such that mechanical connections created at an interface have no fragile phases in a course of thermomechanical cycles to which the part is subsequently subjected,
   wherein the cladding e) includes deforming a plastic receptacle, filled with an incompressible fluid, and in direct contact with the inner surface of the second blank made of steel, or steel alloy, or superalloy by compression.

2. A method according to claim 1, wherein the producing a) includes beta or alpha-beta forging or casting of a titanium alloy.

3. A method according to claim 1, wherein the producing b) includes pre-rolling or rolling of a plate or drawn rolled welded techniques using a steel alloy.

4. A method according to claim 1, wherein the cladding e) includes:
   heating the first and second blanks fitted one into the other to a temperature of between 150 and 500° C. prior to deforming the plastic receptacle.

5. A method according to claim 1, wherein the producing b) including forming circumferential undulations on the inner surface of the first blank made from titanium or titanium alloy to improve mechanical properties of bonds in an axial direction of the part.

6. A housing obtained by the method according to claim 1.

7. A housing according to claim 6, wherein the steel or steel alloy is chosen from among Inconel® 909 or Inconel® 783.

8. A housing according to claim 6, wherein the titanium alloy is chosen from among Ti 64, Ti 6242, or Ti 6246.

9. A housing according to claim 6, wherein a length of a clad part corresponds only to a part of annular length of the housing.

10. A housing according to claim 6, wherein, downstream from a length on to which the clad part is attached, a wear material configured to define an outer contour of the airstream is attached on to a part made of titanium or titanium alloy.

11. A high-pressure axial compressor comprising, as a stator, a housing according to claim 6.

12. A high-pressure compressor according to claim 11, wherein a length of the housing constitutes only an upstream part of the compressor, and wherein an inner wall demarcating an outer contour of the downstream airstream is made from titanium or titanium alloy.

13. An aircraft engine comprising a compressor according to claim 11.

* * * * *